United States Patent [19]
Cope

[11] Patent Number: 5,211,601
[45] Date of Patent: May 18, 1993

[54] MECHANICAL DEER SKINNING DEVICE

[76] Inventor: Travis L. Cope, Rte. 3 Box 29-A, Hamburg, Ark. 71646

[21] Appl. No.: 817,394

[22] Filed: Jan. 6, 1992

[51] Int. Cl.⁵ ............................................. A22B 5/168
[52] U.S. Cl. ..................................... 452/187; 452/128
[58] Field of Search ................ 452/187, 189, 128, 125

[56] References Cited
U.S. PATENT DOCUMENTS

| | | | |
|---|---|---|---|
| 3,404,431 | 10/1968 | Knauss | 452/128 |
| 3,789,458 | 2/1974 | Brown | 452/128 |
| 4,806,063 | 2/1989 | York | 452/187 |
| 4,903,372 | 2/1990 | Jones | 452/187 |

FOREIGN PATENT DOCUMENTS 1273359  7/1968  Fed. Rep. of Germany ...... 452/189

Primary Examiner—Willis Little
Attorney, Agent, or Firm—Donald A. Kettlestrings

[57] ABSTRACT

A mechanical device for removing the skin from whitetail deer or other game animals of simular size. This invention is self-supporting and needs no assistance from tree limbs or other permanent overhead structures as conventional methods. With the skin holders (21) the skin is held stationary while the carcass is lifted and pulled from the skin. The carcass is pulled from the skin by mechanical means as compared to the skin being pulled from the carcass by hand with the present method.

4 Claims, 5 Drawing Sheets

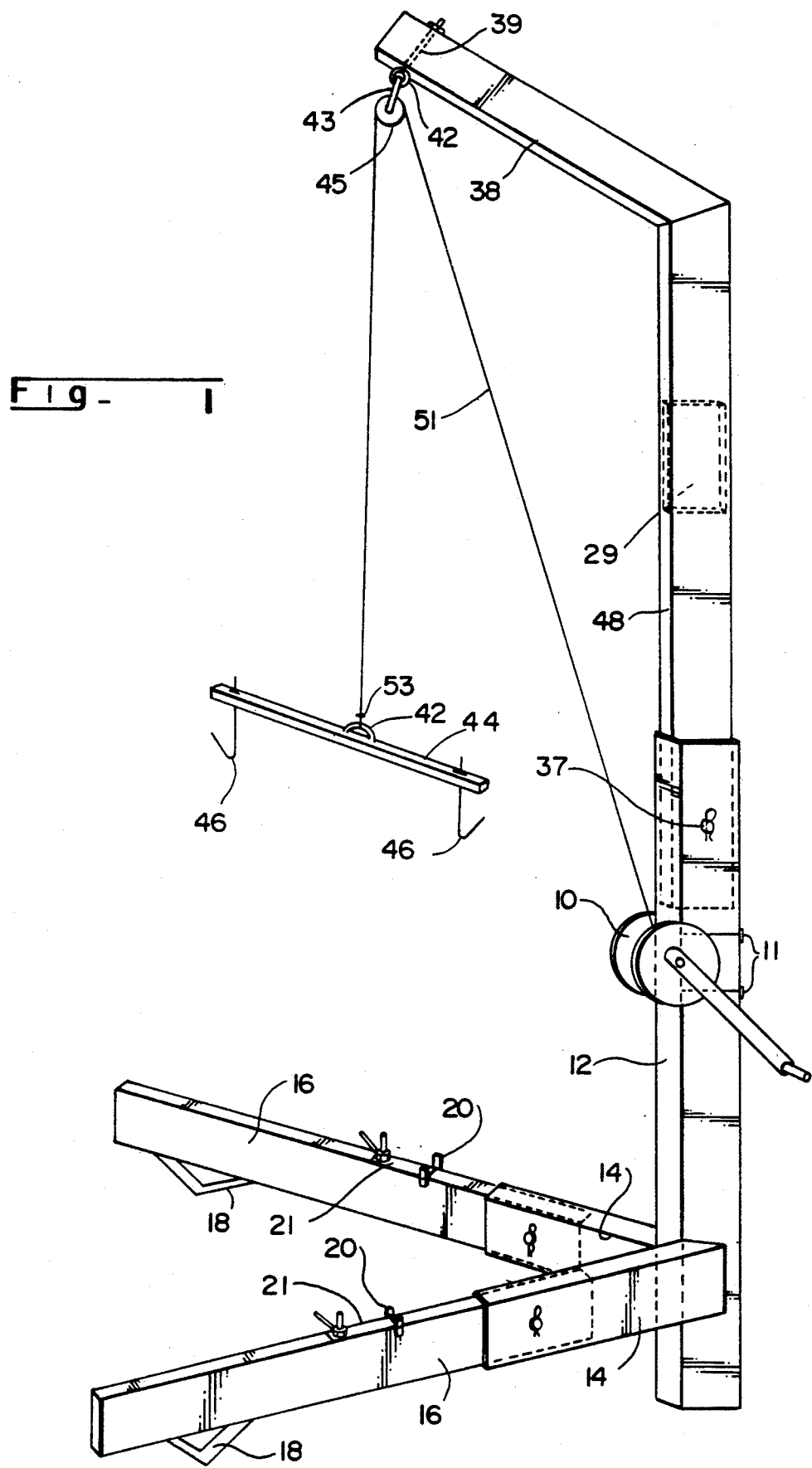

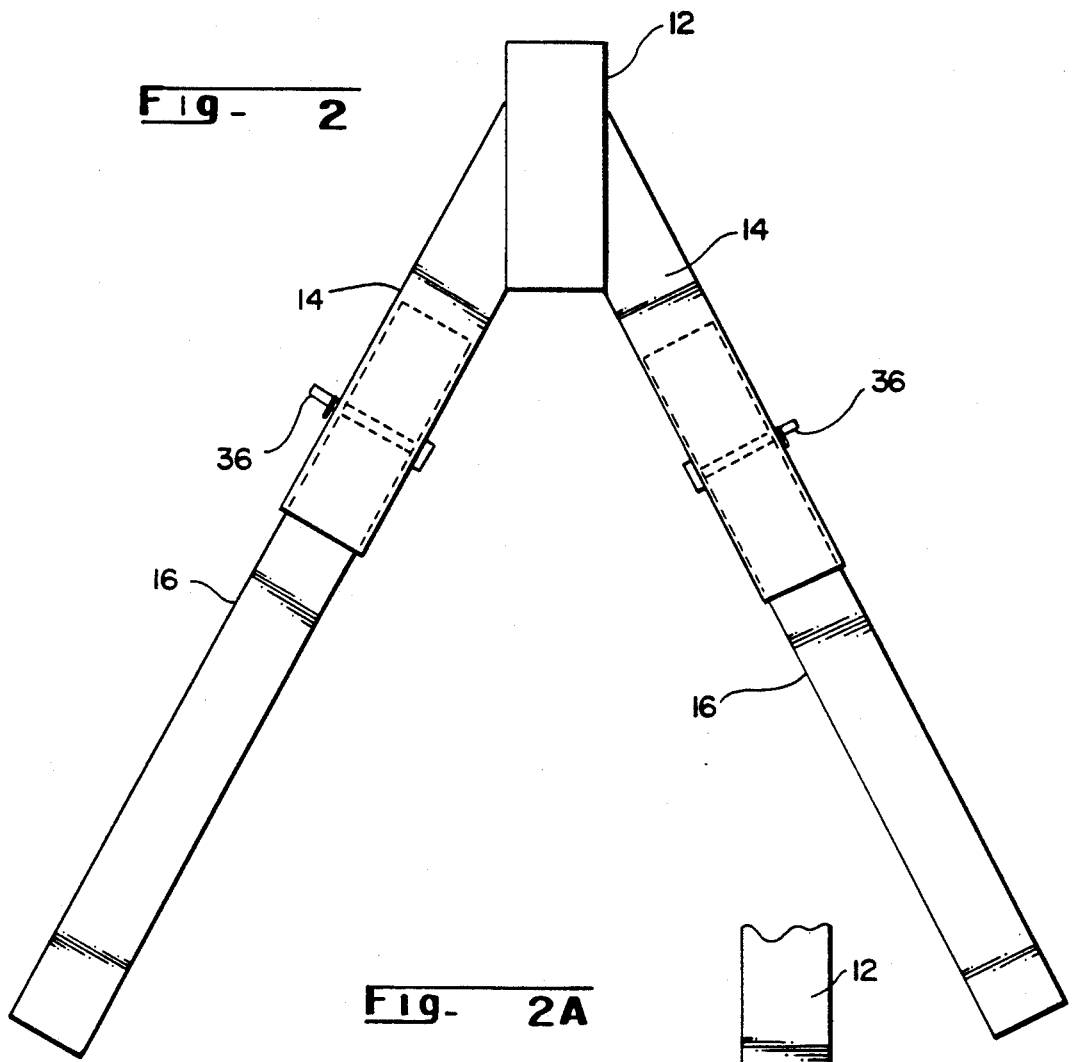
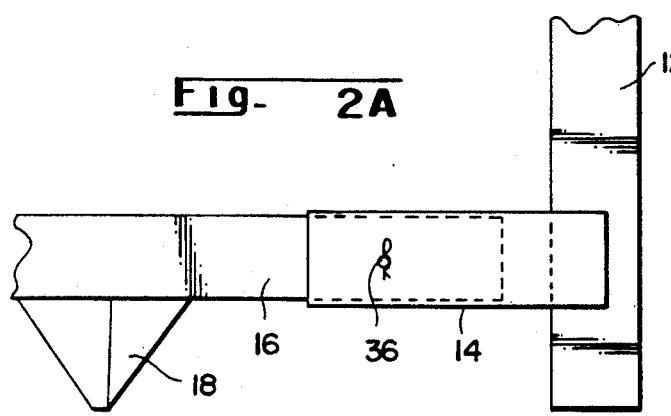

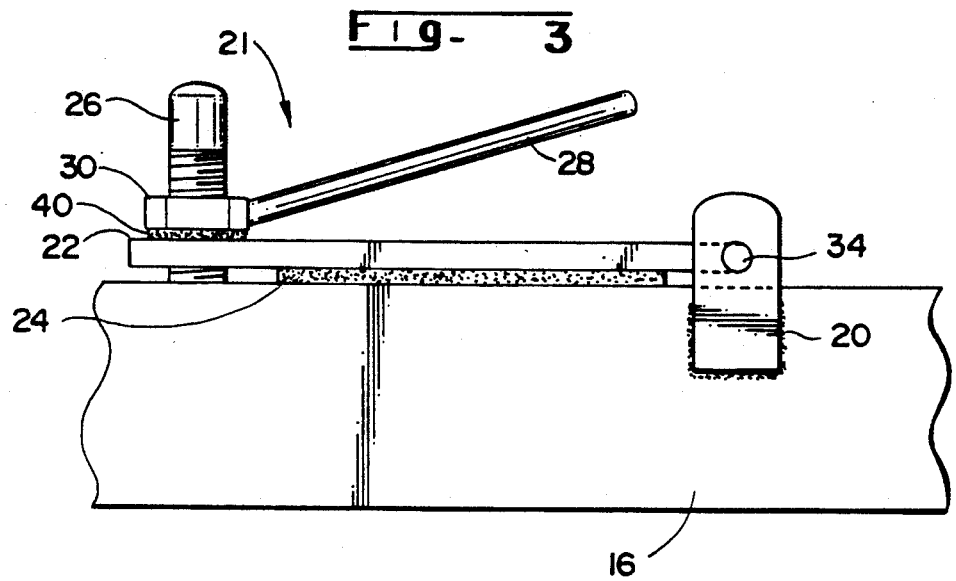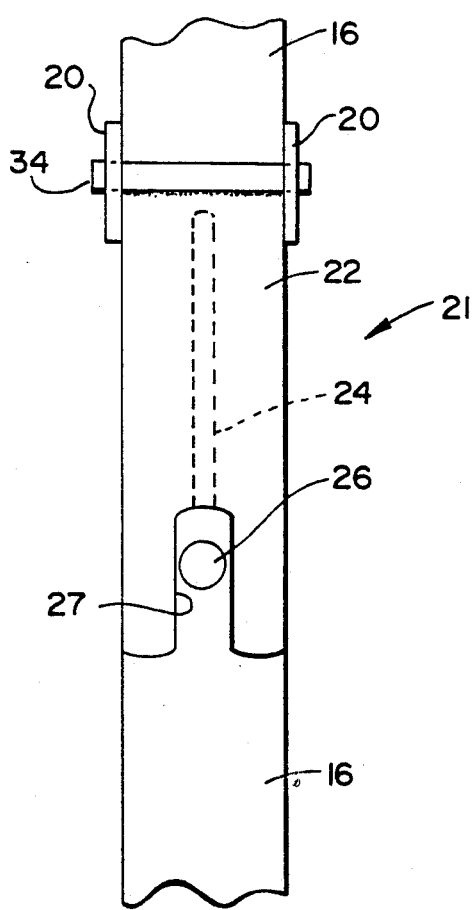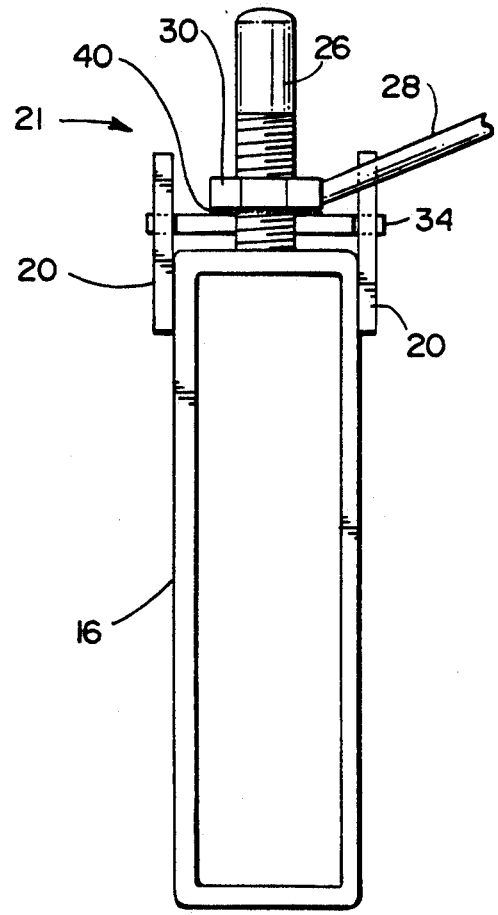

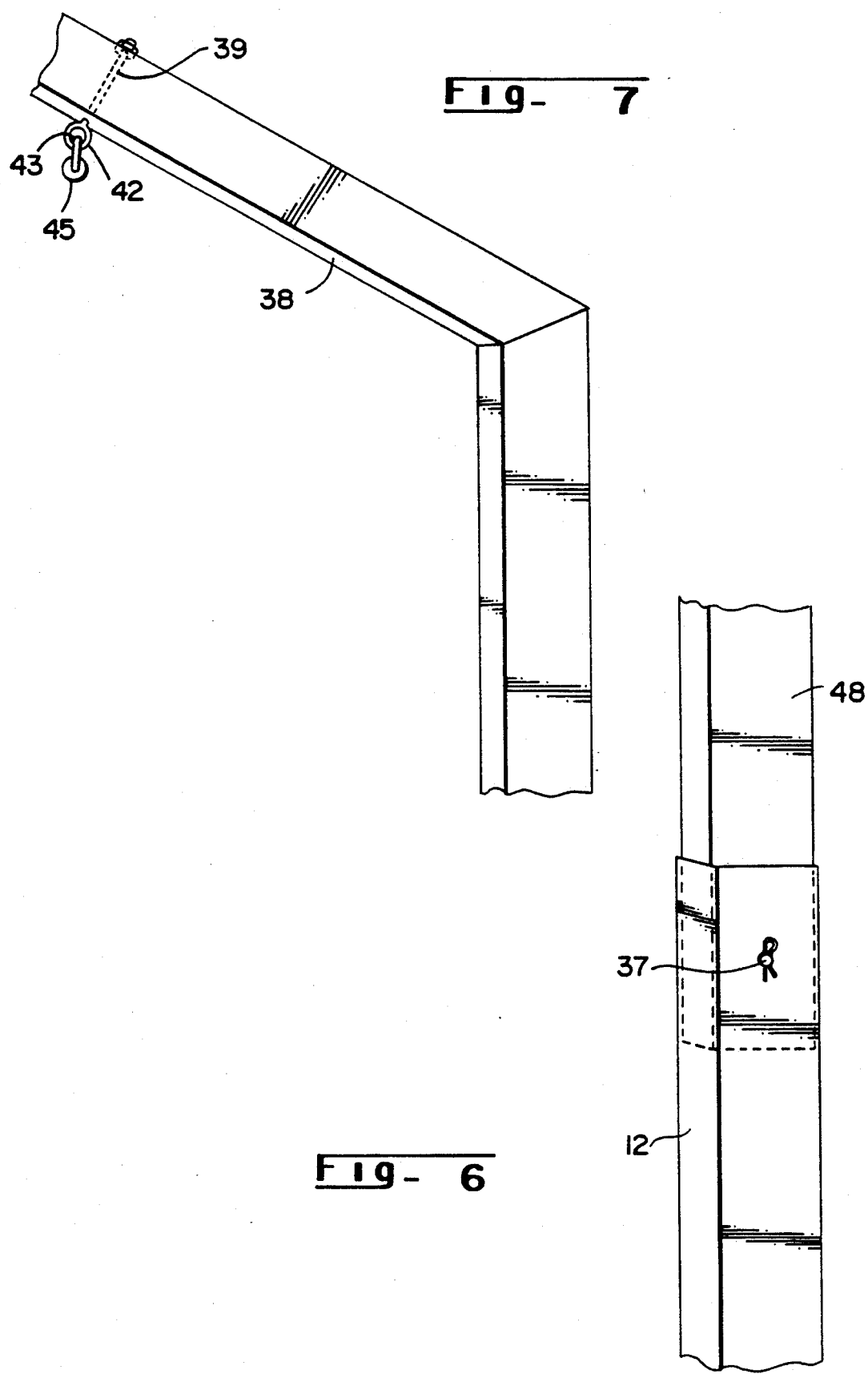

MECHANICAL DEER SKINNING DEVICE

BACKGROUND

1. Field of Invention

This invention relates to the skinning of Whitetail deer ie. removing the skin from the animal.

2. Discussion of Prior Art

Heretofore, the Patent Pending Skin'r Stick or some other type of gimble stick is the only device used for skinning whitetail deer. A singletree or whiffletree which is used on horse-drawn implements is still used by many people. The gambrel stick hooks are placed in the tendons of a deer's hind legs. A rope is attached to the gambrel stick and run over a overhead fulcrum and hoisted by hand until the head of the animal clears the ground. Starting at the rear of the animal the skin is pulled and cut simultaneously by hand the entire length of the animal, making it a time consuming job. This method requires substantial physical strength with the hoisting of the animal and the pulling of the skin while it is being cut. It also requires a permanent overhead structure which is not always where the hunter would prefer it to be. A deer is most often skinned at a hunting camp with several hunters present creating a safety hazard with 2 or more knives skinning the same animal. Conditions are often primitive on a hunt, soap and water for clean hands and utensils sometimes being at a minimum. So much cutting and pulling of the skin and handling of the carcass make for unsanitary conditions. Most times 2 or more people are required to hoist a whitetail off the ground for skinning. Large whitetails can weigh up to 250 lbs. or more, thus being difficult for one person to lift.

OBJECTS AND ADVANTAGES (a) no lifting of the deer by hand is necessary as it is done with the winch;

(b) labor saving, it is not necessary to physically pull the skin off the deer as it is automatically pulled loose when it is lifted with the winch;

(c) safety factor, less knife use is required since the winch pulls the skin from the animal, thus reducing the amount of cutting necessary;

(d) time saving, with this invention the whole procedure can be accomplished in a mere 2 to 3 minutes as compared to conventional methods which may require 30 to 45 minutes;

(e) sanitary, conventional methods require a lot of hand contact to remove the skin from the carcass, with this invention the carcass is virtually untouched;

(f) one person is all that is required to operate this invention, extra help as commonly used with other methods is not needed;

(g) portable, this invention is easily assembled and disassembled, only a few minutes is required for either procedure and it can be carried in a small pick-up truck, there are 7 pieces, the largest 2"×4"×5'6" long which can easily store away for later use, all material is lightweight metal and will operate on any farely level surface, no permanent overhead structure is required;

(h) virtually no maintenance is required for this invention, over an extended period some moving parts may need light oil, all surfaces are primed and painted for durability;

(i) the main objective of this invention is the ease of handling the deer, virtually no physical labor is necessary.

DRAWING FIGURES

In the drawings closely related figures have the same number but different alphabetic suffixes.

FIG. 1 shows a top view of the ground support for the invention.

FIG. 1A shows a side view of the ground support.

FIG. 2 shows a side view of the mechanism which holds the skin down while the carcass is being winched up.

FIG. 2A shows the top view of the mechanism which holds the skin down while the carcass is being winched up.

FIG. 2B shows the end view of the mechanism which holds the skin down while the carcass is being winched up.

FIG. 3 and FIG. 3A show the connection of the top sections. FIG. 3 is inserted into FIG. 3A.

FIG. 6 shows middle connection held together with a $\frac{1}{4}$" pin and cotter key.

FIG. 7 shows 45° angle of tubing at the top of the invention.

REFERENCE NUMERALS IN DRAWINGS

Figure 4:
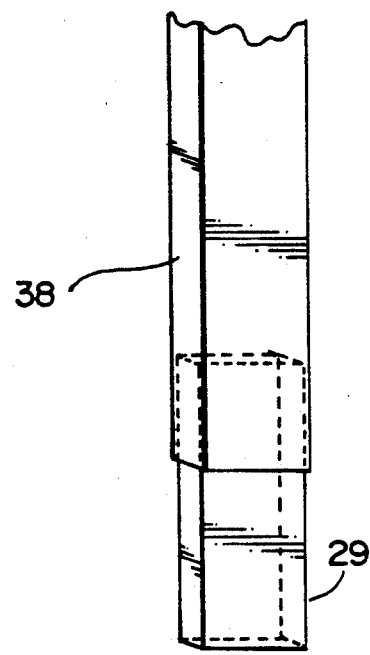
FIG. 4 shows detailed description of the gimble stick.

| 12 | Ground upright |
| --- | --- |
| 14 | Ground support |
| 16 | Ground support insert |
| 18 | Ground support leg |
| 20 | Swivel clip with 11/32" drilled hole |
| 21 | Skin holder |
| 22 | Pressure bar |
| 24 | Pressure rod |
| 26 | Pressure adjustment bolt |
| 28 | Pressure adjustment handle |
| 30 | Pressure adjustment nut |
| 32 | Pressure adjustment washer |
| 34 | Pressure bar hinge |
| 36 | $\frac{1}{4}$" pin and cotter key |
| 38 | Head piece |
| 40 | $\frac{1}{4}$" flat washer |
| 42 | Cable eye |
| 44 | Gambiel stick |
| 46 | Tendon hooks $\frac{1}{4}$" |
| 48 | Center piece |

DESCRIPTION OF FIGS. 1 TO 7

All tubing is rectangle $\frac{1}{4}$" thickness FIG. 1 shows ground supports 14 cut on 45° angle and welded to ground upright 12. The ground support inserts 16 are inserted into ground supports 14 and made stationary with $\frac{1}{4}$" pin and cotter key 36.

FIG. 1A shows positioning of ground support leg 18. $\frac{1}{4}$"×1 $\frac{1}{4}$" flat iron bent to 45° angle and welded to ground support insert 16.

FIGS. 2, 2A and 2B shows a skin holder 21 with pressure bar 22 welded to the pressure bar hinge 34. A pressure bar hinge 34 overhangs the pressure bar 22 so it can swivel in the holes drilled in the swivel clip 20. The swivel clip 20 is welded to the ground support insert 16. A pressure bar rod 24 is welded to the pressure bar 22. A pressure adjustment bolt 26 is welded to the ground support insert 16 in the center of a slot cut in the pressure bar 22. A pressure adjustment handle 28 is welded to the pressure adjustment nut 30. A ¼" flat washer is placed between the pressure bar 22 and the nut 30.

FIG. 3 shows a 14" piece of 1⅜"×3¼" rectangle tubing welded inside the head piece 38, that will be inserted 10" into center piece 48, and will overhang the ground support.

FIG. 4 shows the gambrel stick 44 with cable eye 42 welded in the center. A 9/16" hole is drilled in each end for the tendon hooks 46. A flat washer 40 is welded to the top of the tendon hooks 46.

Figure 5:
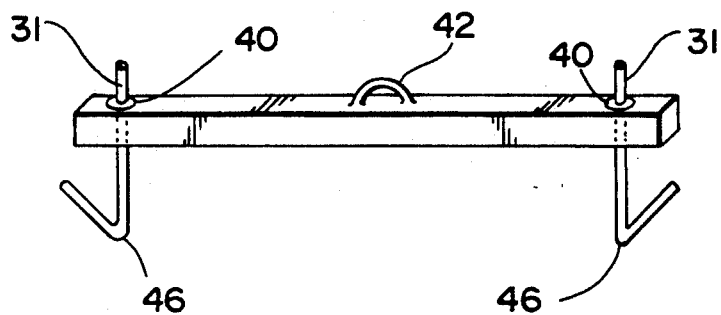
FIG. 5 shows the hand which and its adjustable height and can be mounted for left or right hand operation.
Figure 4A:
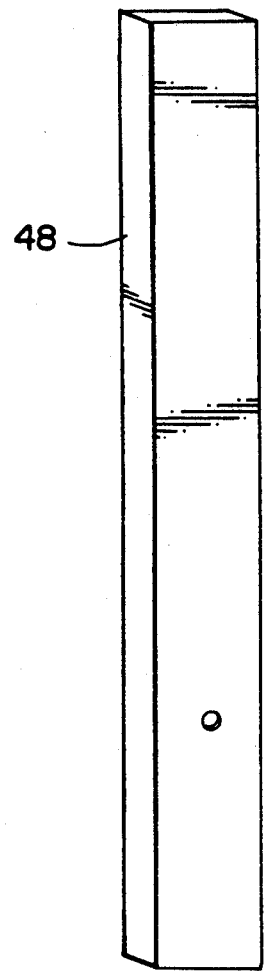

FIG. 5 is a hand-winch 1100 lb. capacity mounted with two 5/16" U-bolts Making the height adjustable and left or right hand operation.

FIG. 6 center piece 48 is inserted into ground upright 12 and made stationary with ¼" pin and cotter key 36.

FIG. 7 head piece 38 is two pieces of rectangle tubing 1⅜"×3¼" each nut to 22½° angle to form a 45° angle. A 9/16" hole is drilled in the end for a ¼" eye bolt. A 5/16" shackle secures a pulley to the eye bolt. A 5/16" wire cable is run from the winch FIG. 5 through the pulley and clamped to the cable eye 42 with 5/16" cable clamp.

OPERATION OF INVENTION

In order to use this invention properly a deer must be laying on its back between the ground support inserts 16 with its hind legs directly under the gambrel stick 44.

With a knife the skin must be ringed or cut just above the back feet and split to the vent. Just enough skin to reach is pulled from each leg by hand and placed between the ground support insert 16 and the pressure rods 24. Firm hand pressure is applied with the pressure adjustment handle 28.

The tendon hooks 46 are placed in the tendons of the back feet. The hand-winch is then turned, lifting the carcass. The tail bone must be separated from the carcass as soon as it begins to bind, then the process is completed by simply lifting the deer up while the skin is held down by the skin holder 21. The skin is then cut away from the front feet and neck. The deer carcass can then be processed as the hunter sees fit.

CONCLUSION

This invention has simplified what many hunters view as a painstaking, laborious task. The Mechanical Deer Skinning Device is safer because the use of a knife is greatly reduced to just a few simple cuts as compared to cutting the skin all the way off. Only one person is required to operate this unit, thus eliminating any necessary additional help. The timesaving advantage of this invention, it most memorable feature, is incomparable with any other method.

I claim:

1. A method for removing the skin from a whitetail deer or other game animal carcass comprising the steps of:

providing a portable free-standing supporting structure for holding said deer or other animal carcass;
    positioning said deer or other animal carcass beneath a portion of said structure;
    attaching predetermined parts of said deer or other animal carcass to be held by said structure;
    cutting a predetermined part of the skin of said deer or other animal carcass and removing a predetermined portion of said skin from the deer or other animal carcass;
    attaching said predetermined portion of said skin to a fixed portion of said structure; and
    lifting said deer or other animal carcass by means of said structure while said predetermined portion of said skin is held stationary by said structure whereby the skin of said deer or other animal carcass is removed from the carcass as the carcass is raised.

2. A portable animal carcass skinning device comprising:

a free-standing animal carcass support structure;
    a winch and a pulley attached to said structure;
    a cable extending from said winch and over said pulley;
    means connected to said cable and normally suspended beneath said pulley for attaching to predetermined parts of said carcass; and
    skin holder means connected to portions of said structure for gripping and holding predetermined parts of the skin of said carcass, which predetermined parts have been removed from said carcass, whereby the skin of the animal is removed from the carcass by lifting the animal carcass with said winch, said cable and said pulley while holding said predetermined parts of the skin in said skin holder means.

3. A device as in claim 2 wherein each of said skin holder means comprises:

a bar having a first end hingedly attached to said support structure and having a second end defining a slot therein;
    said bar positioned for selectively engaging a portion of said support structure for clamping said predetermined parts of the skin of said carcass between said bar and said support structure;
    a threaded bolt connected to said support structure and located for selective positioning within said slot when said bar is positioned for clamping said predetermined parts of the skin between said bar and said support structure; and
    a nut for threadably engaging said bolt to engage said second end of said bar for forcing said bar tightly against said predetermined parts of the skin, whereby said predetermined parts of the skin are tightly held and gripped.

4. A device as in claim 3 further including a handle attached to said nut for assisting tightening and loosening of said nut on said bolt.

* * * * *